United States Patent [19]

Lauer et al.

[11] Patent Number: 4,641,997
[45] Date of Patent: Feb. 10, 1987

[54] SYNTHETIC SEAWEED KIT AND SYNTHETIC SEAWEED MATRIX FORMED THEREBY

[76] Inventors: John F. Lauer, 627 Lincoln Dr., Twin Lakes, Wis. 53181; Ronald Greenberg, 4135 Hudson Dr., Hoffman Estates, Ill. 60195; Raymond A. Van De Walle, 10365 Deerlove Rd., Glenview, Ill. 60025

[21] Appl. No.: 702,501

[22] Filed: Feb. 19, 1985

Related U.S. Application Data

[63] Continuation-in-part of Ser. No. 448,375, Dec. 27, 1982, abandoned.

[51] Int. Cl.⁴ .............................................. E02B 3/04
[52] U.S. Cl. ........................................ 405/24; 405/21
[58] Field of Search .................................. 405/23–25, 405/15, 16; 119/3

[56] References Cited

U.S. PATENT DOCUMENTS

| | | | |
|---|---|---|---|
| 3,540,415 | 11/1970 | Bromley | 405/24 X |
| 3,590,585 | 7/1971 | De Winter | 405/24 |
| 3,830,011 | 8/1974 | Ochrymowich | 52/DIG. 10 |
| 4,130,994 | 12/1978 | Van Moss | 405/24 |
| 4,221,500 | 9/1980 | Garrett | 405/24 |
| 4,341,489 | 7/1982 | Karnas | 405/25 X |
| 4,374,629 | 2/1983 | Garrett | 405/24 |
| 4,478,533 | 10/1984 | Garrett | 405/24 |
| 4,490,071 | 12/1984 | Morrisroe | 405/21 X |

FOREIGN PATENT DOCUMENTS 1541188  8/1968  France ................................. 405/23

Primary Examiner—Dennis L. Taylor
Attorney, Agent, or Firm—Y. Judd Azulay

[57] ABSTRACT

A synthetic seaweed kit comprising (a) a plurality of synthetic seaweed units, wherein each synthetic seaweed unit is constructed of a single piece of flexible woven polyethylene material which is stitched in such a way as to create a cylindrical tube at its base having a first and second end. One of which is stitched closed, the remainder of the flexible material extends outwardly from said cylindrical tube and terminates at a free-end portion; and (b) a plurality of means for interconnecting at least three synthetic seaweed units.

A synthetic seaweed matrix comprising such synthetic seaweed units interconnected by such interconnecting means.

In addition, synthetic seaweed comprising a single piece of flexible woven material which is stitched in such a way as to create a cylindrical tube at its base and from which the remainder of the flexible material extends outwardly and terminates at a free-end portion.

8 Claims, 11 Drawing Figures

VARIATION

VARIATION

BASIC HEXAGON GRID

VARIATION

SYNTHETIC SEAWEED KIT AND SYNTHETIC SEAWEED MATRIX FORMED THEREBY

BACKGROUND OF THE INVENTION

1. Field of Invention

The present invention is a continuation in part of application Ser. No. 448,375, filed Dec. 27, 1982, now abandoned, and relates to a synthetic seaweed kit and to a synthetic seaweed matrix formed thereby.

2. Description of the Prior Art

Prior to the present invention, artificial seaweed constructions have been proposed for combating coastal erosion. For example, U.S. Pat. No. 3,299,640 describes a seaweed type structure for influencing the submarine migration of material. This structure consists of a screen formed by a large series of filamentary plastic strands secured at one end of an anchoring device placed at the bottom of the sea. The strands are buoyant and therefore assume and retain an upright position thereby reducing currents in the surrounding water while promoting the deposition of sand and other solid materials entrained by the water. Also shown in the above patent is a group of individual spaced-apart buoyant tapes secured to a rope-dash-like anchor. In each instance, the function of these constructions is to combat coastal erosion.

U.S. Pat. No. 3,323,310 discloses an installation for a body of water for intercepting waves or currents and causing sand therefrom to settle. This installation comprises a rigged, elongated structure of material heavier than water and disposed on the floor of the body of water, in the plurality of vertical rods embedded in the structure from one end of the structure to the other, the rods being flexible and being separated from each other above the structure. The structure comprises an aligned series of modular units disposed side-by-side to form the elongated structure, the height of the rods in succeeding units away from the shoreline as being greater. Accordingly, the top portions of all rods in the succeeding units are substantially at the same vertical level although the water floor may gradually drop away relative to the water edge.

U.S. Pat. No. 3,559,407 and U.S. Pat. No. 3,590,585 also disclose artificial seaweed wherein assemblages of filamentary strands of foam, stretch polyolefin are used for influencing the migration of material at the bottom of bodies of water, as in combatting coastal erosion. Entanglement of the filamentary strands is troublesome during manufacture, installation and use, and U.S. Pat. No. 3,590,585 discusses several approaches to prevent such entanglement.

U.S. Pat. No. 3,648,464 teaches a method and means placing artificial seaweed in place on a particulate floor of a body of water which comprises releasably securing the lower end of a fluid conduit to an anchoring means having strands of buoyant, water-resistant elongated flexible strands secured thereto and having fluid outlet orifices communicating with the fluid conduit and directed against the particular floor. Fluid is forced through a conduit while the anchor means is adjacent to or resting on or pressed against the floor to displace particulate matter, thereby causing the anchoring means to settle into a resulting cavity as it is formed. The discontinuance of fluid flow permits particulate to settle over the anchor means. The conduit is then disconnected from the anchoring means.

U.S. Pat. No. 4,221,500 also discloses synthetic seaweed for use in inhibiting coastal erosion. The synthetic seaweed of U.S. Pat. No. 4,221,500 comprises the elongate anchor with at least one sheet of flexible nonwoven material adjacent thereto. A first-edge portion of the sheet is secured to the anchor along at least a portion thereof so that this sheet extends outwardly from the anchor terminating at an outer boundary edge. The flexible, nonwoven sheet has a series of spaced-apart, substantially parallel cuts extending from the outer boundary edge to, but not through, the first-edge portion to thereby define a plurality of flexible strips integrally connected by the first-edge portion of the sheet. This sheet may be buoyant with or without tabs of closed cell, low density foam, affixed to the free-end portions of the individual strips to enhance the buoyancy thereof. Also, the sheet may have a specific gravity greater than water with such tabs applied to the strip to provide buoyancy. In use, the anchor rests upon the bottom of the sea and the submerged, flexible strips of nondetrimental material extend upwardly therefrom. These strips sway in the ocean water, thereby reducing currents in the surrounding water which permits a secretion of suspended sand and promotes sedimentation of solid particles.

Generally, the material used in these prior patents was a non-woven, spunbonded fiber, a welded-together fiber, or, as polyester, a material fused by different melting points of fibers used. All these materials have a problem of fibrilating or unravelling of individual fibers due to abrasive actions. This abrasive action will begin to remove surface fibers and have considerable effect on structural integrity.

Obviously, it is important that once any artificial seaweed construction is installed, such construction functions to promote sedimentation of solid particles. It is therefore desirable that the seaweed be sufficiently strong and durable to withstand ocean forces for extended periods of time and also particularly designed so that the majority of filamentary strands or tapes remain free of entanglement.

In addition, it is also important that, once any artificial seaweed construction is installed, it collects sand. In order to do so, it must offer resistance to existing ocean currents. If that current is too powerful, it simply either spins the individual artificial seaweed unit into a position of reduced effectiveness or disrupts the line of artificial seaweed units into such a position of reduced effectiveness. Repositioning in both these instances is most likely to occur where sand collection potentials may be greatest, such as the top of sand bars, tips of groins, or heavily-scoured beaches. Although this problem has been addressed in some of the above patents, none of the patents have suggested a truly viable and efficient solution thereto.

Other patents of interest which do not disclose or suggest this invention include U.S. Pat. Nos. 4,130,994; 3,830,011; and 4,341,489.

SUMMARY OF THE INVENTION

According to the present invention, the repositioning problems characteristic of singularly-positioned artificial seaweed units and laterally-joined artificial seaweed units are solved by the provision of a grid wherein each artificial seaweed unit is connected to at least two other units, thereby producing an enhanced ballast weight. With each unit sharing this enhanced ballast weight, shifting is nonexistent. In addition, the grid thereby formed by the connected artificial seaweed units enables the resulting matrix to present multiple lines of resistance to current and/or storm activity in virtually any direction of current flow. This multi-angular configuration thereby greatly increases the number of sand-collecting days in any given season.

More particularly, the present invention encompasses a synthetic seaweed kit comprising (a) a plurality of synthetic seaweed units, wherein each synthetic seaweed unit is constructed of a single piece of flexible, woven polyethylene material which is stitched in such a way as to create a cylindrical tube at its base having a first and second end, one of which is stitched closed, the remainder of the flexible material extends outwardly from said cylindrical tube and terminates at a free-end portion; and (b) a plurality of means for interconnecting at least three synthetic seaweed units.

In addition, the instant invention encompasses a synthetic seaweed matrix comprising an interconnected structure of such synthetic seaweed units and interconnecting means.

Also, within the scope of the present invention is a synthetic seaweed comprising an elongate anchor and one piece of flexible, woven polyethylene material secured to an elongate anchor extending outwardly therefrom and terminating at a free-end portion.

Also, within the scope of the present invention is a synthetic seaweed which is fabricated from a single piece of flexible woven material which is stitched in such a way as to create a cylindrical tube at its base forming an anchor and in which the remainder of the flexible material extends outwardly from said cylindrical tube and terminates at a free-end portion.

Still other features and attendant advantages of the present invention will become apparent to those skilled in the art from a reading of the following detailed description of the preferred embodiments, taken in conjunction with the accompanying drawings, wherein like numerals designate like parts in the several figures.

DESCRIPTION OF THE PREFERRED EMBODIMENTS

Figure 1:
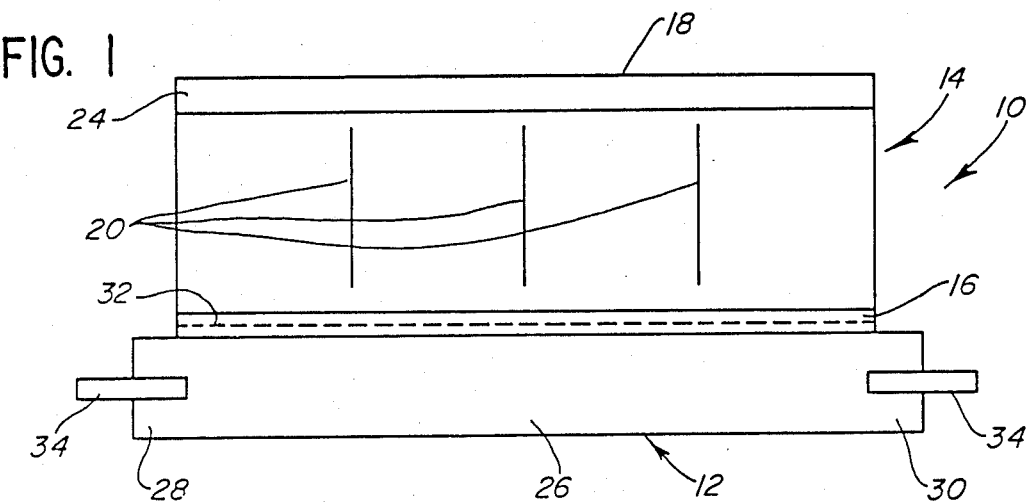
FIG. 1 is a side elevation view of a preferred synthetic seaweed unit of the present invention.
Figure 2:
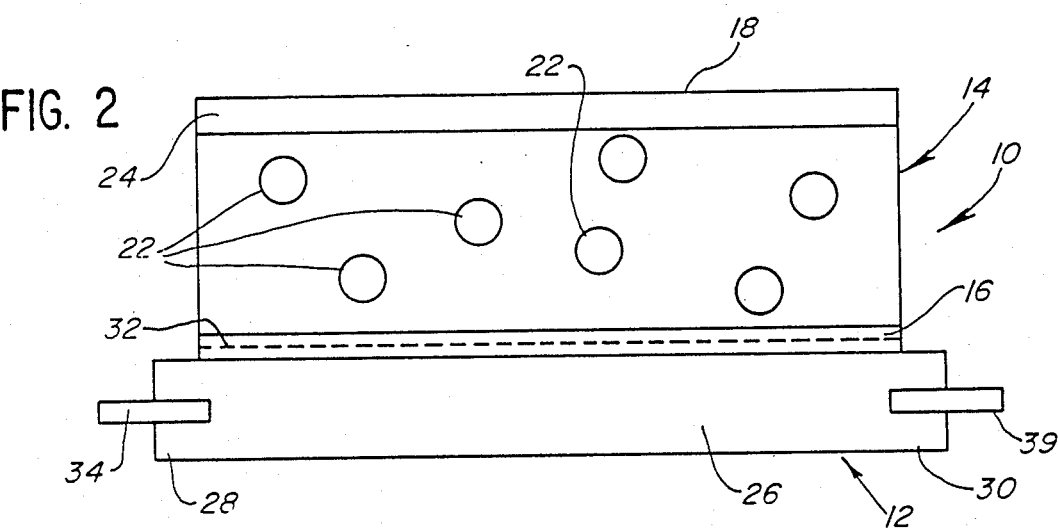
FIG. 2 is a side elevation view of another preferred synthetic seaweed unit of the present invention.

Referring now to FIGS. 1 and 2, a preferred synthetic seaweed 10 comprises an elongate anchor 12 with a sheet of flexible, woven polyethylene material 14 adjacent to the anchor. A first-edge portion 16 of the sheet 14 is secured to the anchor 12 so that the sheet 14 extends outwardly from the anchor, terminating at an outer boundary edge 18. The sheet 14 can be either one continuous unit or can have a series of spaced-apart, substantially parallel cuts 20 extending from a point prior to the free-end portion 18 to, but not through, the first-edge portion 16, or extending through free-end portion 18, or can have a series of openings 22 therein which neither intersect the outer boundary edge 18 nor the first-edge portion 16.

The flexible, woven polyethylene material comprising the sheet 14 may be virtually of any material and construction known to those skilled in the art. Preferably, the flexible, woven polyethylene material employed is of extremely high tensil strength and tear strength. The material uses a "slit film" to form the base weave material.

The base material is made from a high density polyethylene which is "slit" into ribbons and then woven to form the base material. The base fabric is then coated with a low density polyethylene material on both sides to form the finished material. In this coating process, the various layers are bonded together through melting. Thus, the woven material cannot come apart and delaminate as with other woven materials. Further, this woven material will not absorb water and delaminate as will other woven material.

Preferably, the weight of the sheet 14 is within the range of ½ to 12 ounces per square yard, and, more preferably, within the range of 3 to 6 ounces per square yard.

Additionally, the free-end portion 18 or a portion of sheet 14 may be provided with either a single tab 24 or a plurality of tabs 24 of a highly buoyant material, such as closed-cell, foamed polyethylene or other similar material, or closed-cell film material having air or other suitable gas entrapped therein. Preferably, the buoyant material is a closed-cell film material. These tabs may be secured by adhesive or stitching or heat sealing or any other convenient method and served to enhance the overall buoyancy of sheet 14.

The amount of foam material may be varied as long as one inch from the outer boundary edge 18 to an amount covering the full length of sheet 14.

The size of openings 22 can be the same or different and can be of any convenient dimension to those skilled in the art.

The anchor 12 comprises a cylindrical tube 26 of flexible material, closed at its opposite ends 28, 30 and filled with ballast. The tube 26 may be filled with any convenient and inexpensive ballast material, such as sand. The diameter of the tube, which can be easily varied, will depend on a number of factors, including ultimate location of the synthetic seaweed 10, size of sheet 14, length of parallel cuts 20, or size of openings 22. When sand is used as ballast, the tube diameter may be between 12 inches and 24 inches; for example, the flexible material forming the anchor may be of any convenient material and can be fabricated from the same material as sheet 14 or from a different material. Preferably, the anchor is one of a woven material. Although stitches 32 are shown as the means for securing the sheet 14 to the anchor 12, other types of securement may be utilized within this scope of this invention and, in some cases, it may be convenient to form both the anchor and the sheet with a single piece of material with appropriate stitching to form the tube 26.

Figure 3:
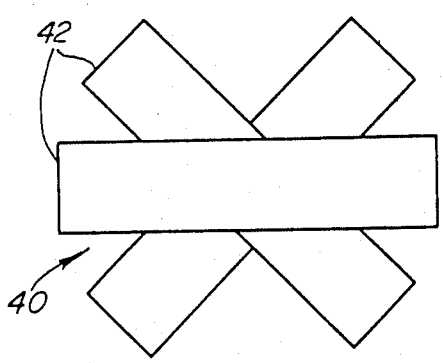
FIG. 3 is a top elevation view of one embodiment of the interconnecting means according to the present invention.
Figure 4:
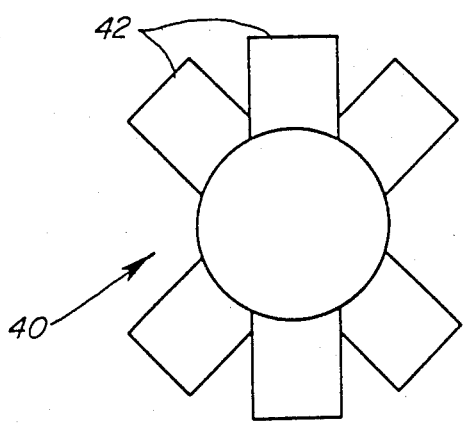
FIG. 4 is a top elevation view of another embodiment of the interconnecting means according to the present invention.

The anchor 12 has means 34 provided at the ends 28, 30 for fastening each end of anchor 12 to means 40, as shown in FIGS. 3 and 4, for interconnecting at least three synthetic seaweed units.

Referring once again to FIGS. 1 and 2 a preferred synthetic seaweed unit 10 is fabricated from one continuous piece of flexible woven material 14. The material is stitched in such a way 16 as to create a cylindrical tube 12 at its bsae which is stitched closed at one end 28 and left open at its opposite end 30.

The flexible, woven polyethylene material comprising the seaweed unit shall be a layered material consisting of woven, polyethylene with criss-crossing ribbons of polyethylene to form a weave pattern ranging from 8 ribbons per inch in the horizontal and verticle to 12 ribbons per inch in the horizontal and vertical. Preferably the woven fabric will have a weave pattern of 10 ribbons of polyethlene per inch in the horizontal and vertical. The ribbons should then be sealed between two additional layers of nonwoven polyethylene film (one top and one bottom) which has a thickness ranging between 1 and 2 mills. The preferable thickness is 1.5 mill per layer of coating. The total thickness of the woven, polyethylene being approximately 7 mills. Minimum standards for the Mullen burst strength of the material used in the fabrication of the seaweed shall be not less than 100 pounds per square inch with the preferable strength of the material being 140 pounds per square inch.

Additionally, the free-end portion 18 in FIG. 1 may be provided with a pocket or pockets 24 which will contain a highly buoyant material, such as closed cell, foamed polyethylene or similar material for closed cell film material having air or other suitable gas entrapped therein. Such pockets shall be stitched closed so as to provide a protective envelope to keep sand or other abrasive matter away from the buoyant material.

The amount of foam material may be varied as long as 3" from the outer boundary edge 18 to 24"; form and outer boundary edge 18.

The cylindrical tube 26 of flexible material comprises an anchor 12 closed at its opposite ends 28, 30 and filled with ballast. The tube 26 may be filled with any convenient and inexpensive ballast material, such as sand. The diameter of the tube which can be easily varied will depend on a number of factors including type of ballast material used to fill the anchor tube and the ultimate location of the synthetic seaweed 10. When sand is used as ballast, the tube diameter may be between 8 inches and 12 inches.

The cylindrical tube 26 which forms the anchor 26 has means 34 provided at the top of the tube for fastening each end of anchor 12 to means 40, as shown in FIGS. 3 and 4, for interconnecting at least three synthetic seaweed units.

Referring now to FIGS. 3 and 4, interconnecting means 40 is preferably adapted to interconnecting the ends of at least three, more preferably from about three to eight, and optimally about six, synthetic seaweed units. The interconnecting means 40 comprises a devise having openings 42 adapted to intimately receive on end of anchor 12. Each opening 42 can be of any convenient shape to those skilled in the art as preferably a cylindrical opening. Interconnecting means 40 has complimentary means associated with it for interfacing with fastening means 34 of anchor 12 to thereby secure in and of anchor 12 into opening 42. The interconnecting means can be made of any convenient material and can comprise either a series of units attached to one another as shown in FIG. 3 or can be formed as a singular continuous structure as shown in FIG. 4.

Figure 5:
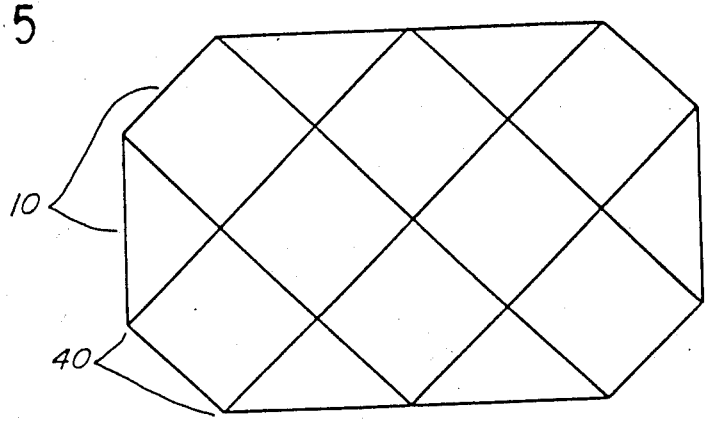
FIGS. 5 through 11 is a schematic representation illustrating typical synthetic seaweed matrices obtainable by the present invention.
Figure 6:
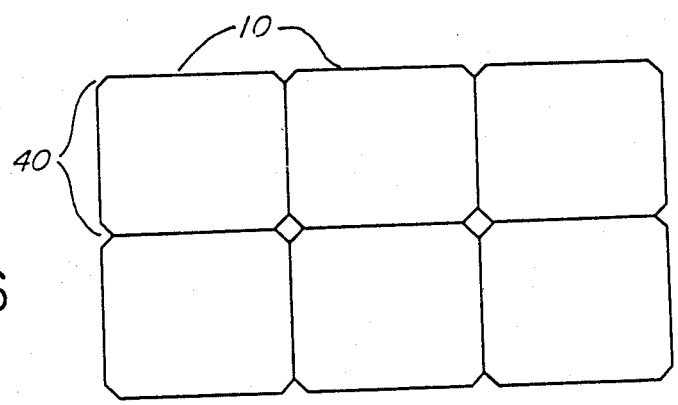
Figure 7:
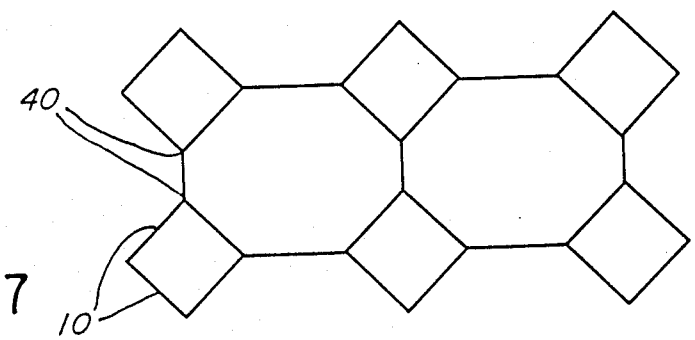
Figure 9:
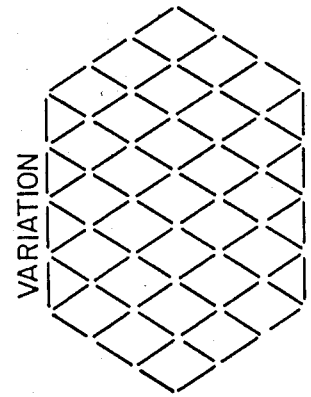
Figure 11:
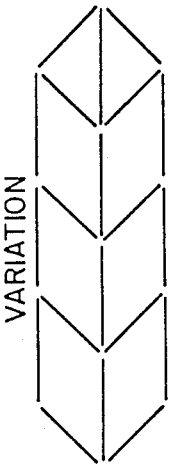
Figure 8:
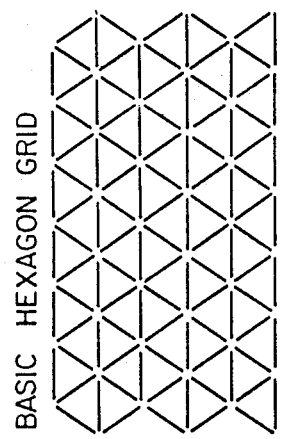
Figure 10:
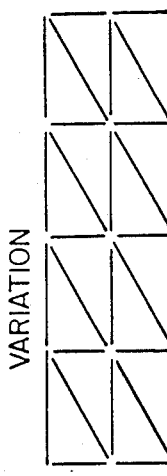

Depending upon the number of openings in interconnecting means 40, one can obtain various synthetic seqweed matrices upon attaching the synthetic seaweed units to the interconnecting means. For example, when one employs an interconnecting means having six openingts therein, one is able to obtain the hexaginal matrix as schematically shown in FIG. 5. Similarly, when one employs an interconnecting means having for openings, one can obtain the square seaweed matrix as shown in FIG. 6. In a third embodiment, when one employs an interconnecting means having three openings therein, one is able to obtain the matrix shown schematically in FIG. 7.

However, it should be clear to one skilled in the art that upon employing a combination of interconnecting means having different openings, one can obtain a random matrix. In addition, other types of synthetic seaweed units can be employed in the synthetic seaweed matrix of the instant invention. One such synthetic seaweed unit is described in U.S. Pat. No. 4,221,500, which is incorporated herein by reference.

Based upon this disclosure, many other modifications and ramifications will naturally suggest themselves to those skilled in the art. These are intended to be comprehended as within the scope of this invention.

The embodiments of the present invention in which an exclusive property or privilege is claimed are defined as follows:

1. A synthetic seaweed kit comprising:
   a. A plurality of synthetic seaweed units, wherein each seaweed unit is constructed of flexible, woven, high density polyethylene material slit into ribbons, woven to form a base material and coated with a low density polyethylene material with the various layers bonded together through melting, which is stitched in such a way as to create a cylindrical tube at its base having a first and second end, one of which is stitched closed, the remainder of the flexible material extends outwardly from said cylindrical tube and terminates at a free-end portion which includes closed pockets containing buoyant material;
   b. At least one opening spaced from said free-end portions; and
   c. A plurality of means for interconnecting each said synthetic seaweed unit to at least two other synthetic seaweed units to form a grid.

2. The kit of claim 1 wherein said interconnecting means comprises a device having six cylindrical openings and each such opening being adapted to intimately receive one end of said cylindrical tube.

3. The kit of claim 1 wherein said cylindrical tube contains ballast and is closed on said first and second ends.

4. The kit of claim 2 wherein
   a. Said device and said cylindrical tube have complementary means associated therewith for fastening said end of said cylindrical tube into said cylindrical opening; and
   b. Said flexible, woven polyethylene material has a high tensile strength and tear strength.

5. The kit of claim 1 wherein said flexible, woven polyethylene material is layered with criss-crossing ribbons of polyethylene to form a weave pattern with from 8–12 ribbons per inch in the horizontal and verticle.

6. The kit of claim 5 wherein said weave pattern contains 10 ribbons of polyethylene per inch in the horizontal and vertical and said ribbons are sealed between two additional layers of non-layered polyethylene film having a thickness from 1–2 mils.

7. The kit of claim 1 wherein said flexible, woven polyethylene material is layered with criss-crossing ribbons of polyethylene to form a weave pattern with from 8-12 ribbons per inch in the horizontal and vertical.

8. The kit of claim 5 wherein said weave pattern contains 10 ribbons of polyethylene per inch in the horizontal and vertical and said ribbons are sealed between two additional layers of non-layered polyethylene film having a thickness from 1-2 mils.

* * * * *